O. BRUNKA.
NUT AND CANDY DEPOSITOR.
APPLICATION FILED SEPT. 9, 1911.
1,036,070.
Patented Aug. 20, 1912.
2 SHEETS—SHEET 1.
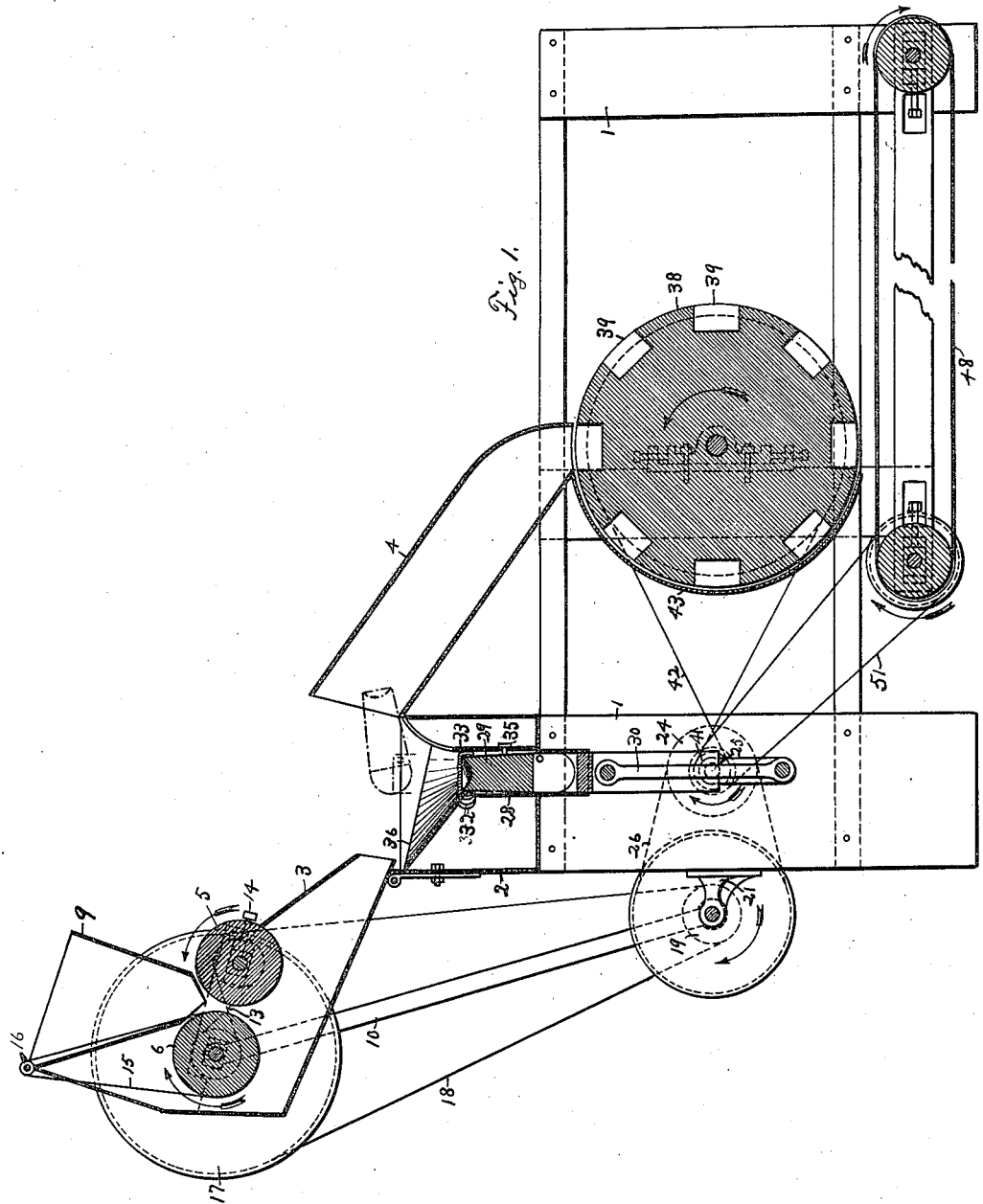
WITNESSES:
INVENTOR
BY
ATTORNEYS

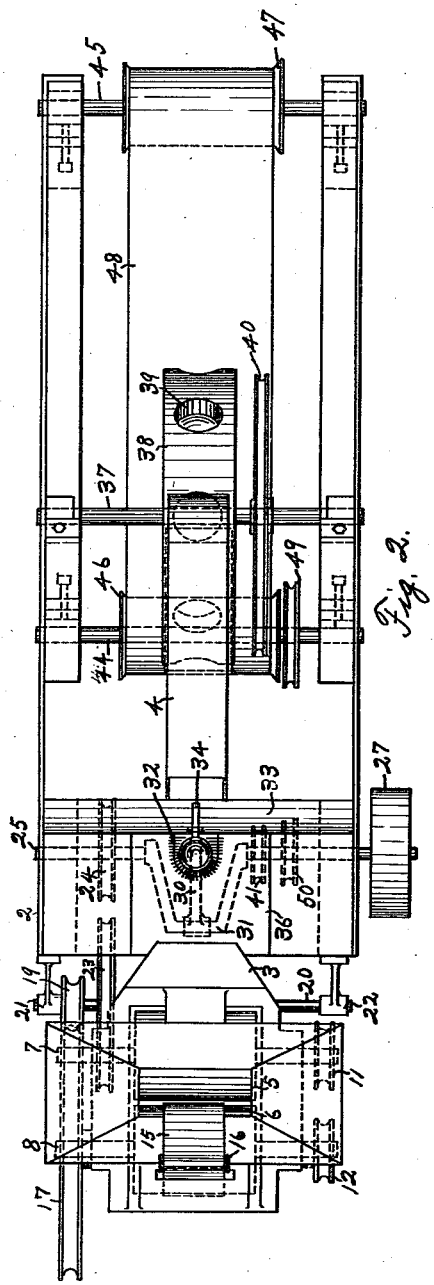

UNITED STATES PATENT OFFICE.

OSCAR BRUNKA, OF SOUTH HOUSTON, TEXAS, ASSIGNOR OF ONE-FOURTH TO JAMES SHIVELY, OF SOUTH HOUSTON, TEXAS.

NUT AND CANDY DEPOSITOR.

1,036,070. Specification of Letters Patent. Patented Aug. 20, 1912.

Application filed September 9, 1911. Serial No. 648,430.

*To all whom it may concern:*

Be it known that I, OSCAR BRUNKA, a citizen of the United States, residing at South Houston, in the county of Harris and State of Texas, have invented certain new and useful Improvements in Nut and Candy Depositors, of which the following is a specification.

My invention relates to new and useful improvements in nut and candy depositors.

The object of the invention is to provide a device of the character described which will automatically feed nuts, candies, etc., to a dipping machine which in turn dips the same in a solution with which it is desired to coat the articles dipped. The device may also be used for depositing the nuts and candies in baskets, specially constructed for the purpose, and which are designed to be manually submerged in the coating solution.

With the above and other objects in view the invention has particular relation to certain novel features of construction, operation and arrangement of parts an example of which is given in this specification and illustrated in the accompanying drawings, wherein:—

Figure 1 is a sectional side elevation of the complete device and Fig. 2 is a plan view thereof.

Referring now more particularly to the drawings, wherein like numerals of reference designate similar parts in each of the figures the numeral 1 refers to a suitable supporting frame upon which the operative mechanism of the device is mounted. The rear end of this frame work carries a transverse receptacle 2 mounted thereon and secured to the rear side of said receptacle and discharging therein is the feed box 3 and secured to the front of said receptacle and leading therefrom is the chute 4. Transversely disposed in said feed box are two oppositely arranged feed rollers 5 and 6, mounted upon the respective shafts 7 and 8, rotatable in suitable bearings in the sides of the feed box 3. These rollers 5 and 6 are composed of rubber or some similar yieldable material so as not to crush the nuts or candy fed therebetween, and arranged above these rollers is the hopper 9, which is secured to the feed box and provided to receive the nuts or candy and direct the same between the feed rollers 5 and 6. The feed box 3 and the appendants thereof are held in position by means of a brace 10. The shafts 7 and 8 carry, respectively the rigidly mounted pulleys 11 and 12 operatively connected by means of the pulley cord 13 so arranged as to rotate the rollers 5 and 6 in the directions indicated by the arrows in Fig. 1, and the roller 5 may be adjusted toward and from the roller 6 by means of hand screw 14 operatively connected with the bearings of shaft 7.

The numeral 15 designates a feed apron which passes around the roller 6 and also around a small roller 16 carried by the upper part of the rear portion of the hopper 9. This apron is composed of any suitable fabric and is provided for the purpose of forcing the contents of the hopper 9 down between the rollers 5 and 6.

The end of shaft 8, opposite the pulley 12 carries the rigidly mounted pulley 17 which receives rotation, through pulley cord 18, from the pulley 19, rigidly mounted on the shaft 20, rotatable in suitable bearings 21 and 22 carried by the rear of the frame work 1. The shaft 20 also carries the rigidly mounted pulley 23 which is alined with the pulley 24 rigidly mounted on crank shaft 25 which is rotatable in suitable bearings in the side members of the frame work 1. Rotation is imparted from the pulley 24 to the pulley 23 by the pulley cord 26. The crank shaft 25 carries a suitable drive pulley 27 through which rotation is imparted to said shaft.

Extending through the bottom of the receptacle 2 is the tubular guide way 28 in which the plunger 29 reciprocates. This plunger is reciprocated back and forth by means of the connecting rod 30 which is pivotally attached thereto and also to the wrist 31 of shaft 25. The upper end of the guide way is surrounded by a coil spring 32 which closely embraces the plunger and prevents the nuts, and pieces of candy from wedging between the plunger and its guide way. The receptacle 2 is provided with a length-wise partition 33 arranged immediately in front of the plunger guide way and which extends vertically to the top of said guide way and then curves outwardly to the upper edge of the front side of the receptacle, as shown in Fig. 1 and this partition is provided with a vertically extending slot 34 along which the bolt 35 is adapted to slide. This bolt passes through said slot and is secured to the plunger 29 but the head thereof engages against said partition 33. The plunger 29 is hinged near the center thereof and the bolt 35 engages with the upper portion of the plunger and as said plunger is forced up by the connecting rod 30 the bolt 35 follows the curve of partition 33 and causes said plunger to assume the position shown in dotted lines in Fig. 1 and discharges into the upper end of chute 4. Secured in the receptacle 2 and receiving from the feed box 3 is a funnel shaped hopper 36 which substantially forms an enlargement of the upper end of the guide way 28. The upper end of plunger 29 is concaved and the articles which pass into the hopper 36 from trough 3 are lifted one at a time by said plunger and discharged into the chute 4.

The numeral 37 refers to a transverse shaft which is rotatable in suitable bearings in the frame 1 and is located centrally with respect to the ends and also to the top and bottom of said frame. Rigidly mounted upon this shaft is a drum 38 which is provided with a plurality of recesses 39 in the periphery thereof and arranged a uniform distance apart thereround. This shaft 37 also carries the rigidly mounted pulley 40 which receives rotation from the pulley 41, rigidly mounted on shaft 25, through the pulley cord 42 and the rotation of said pulley 40 and the drum 38 is in the direction indicated by the arrow in Fig. 1. The rear side of the drum 38 is closely embraced by the stationary apron 43 and the discharge end of the chute 4 is so positioned as to feed the articles passing through the same into the recesses 39 in the periphery of said drum and there are a sufficient number of said recesses to carry away said articles as fast as they are delivered from the plunger.

Located near the bottom of the frame 1 and at each end thereof are the respective shafts 44 and 45 which carry the rigidly mounted spools 46 and 47, respectively. These spools support the traveling apron 48 which passes closely underneath the drum 38 and the articles which are deposited in the recesses 39 from the chute 4, are retained therein by the stationary apron 43 until the recesses pass the lower end of said apron and are then discharged at a uniform distance apart upon the traveling apron 48, by which they are carried to the dipping machine, which is of the well known construction and has not been shown in the drawings. The shaft 44 carries the rigidly mounted pulley 49 alined with a similar pulley 50 rigidly mounted on shafts 25 and the latter pulley transmits rotation to the former and through it to the apron 48, through the pulley cord 51.

The nuts or other articles to be dipped are first placed in the hopper 9 and are fed between the rollers 5 and 6 into the trough 3 and pass thence into hopper 36. The rotation of shaft 25 operates through the wrist 31 and connecting rod 30 to reciprocate the plunger 29 and said articles are carried by said plunger, one at a time, and delivered to the chute 4 and by it to the recesses 39. The rotation of the drum 38 carries the articles around and deposits them, one at a time, at a uniform distance apart, on the traveling apron 48, underneath said drum 38, and this apron carries said articles to the dipping machine as hereinbefore set forth.

What I claim is:—

1. In a device of the character described, a reciprocating plunger, a guide way therefor, a driving mechanism, a means connecting said plunger with said driving mechanism, a hopper through which said plunger reciprocates and a resilient member carried by said guide way and surrounding the plunger.

2. In a device of the character described, a reciprocating plunger composed of two sections hingedly secured together, a guide way for said plunger, a driving mechanism therefor, a means operatively connecting the plunger and driving mechanism, a hopper through which the plunger reciprocates, a transverse outwardly diverging partition arranged along side of said hopper, and a means rigidly secured to the upper section of said plunger and extending through a vertically extending slot in said partition and engaging with said partition.

3. A device of the character described including a suitable frame work and a receptacle carried thereby, a hopper mounted in the upper portion of said receptacle, a guide way carried by the bottom of said receptacle and communicating with said hopper, a reciprocating plunger in said guide way, said plunger being composed of two sections hingedly secured together, a driving mechanism, a means operatively connecting said mechanism with said plunger, a driving mechanism with said plunger, a transverse partition in said receptacle arranged along the side of said hopper and guide way whose upper end curves outwardly from the hopper, a means secured to the upper section of the plunger and passing through a vertically extending slot in the partition and engaging with said partition, and a resilient member secured at the upper end of said guide way and surrounding said plunger.

4. In a device of the character described, a suitable supporting frame and a receptacle carried thereby, a hopper arranged in said receptacle, a guide way carried by the bottom of said receptacle, a reciprocating plunger operating in said guide way and arranged to pass through said hopper, said plunger being composed of two sections hingedly secured together, the free end of said upper section being concaved; a driving mechanism, a means connecting said driving mechanism with said plunger, a transverse partition in said receptacle arranged along side of said guide way and hopper and having its upper edge outwardly curved relative to the hopper, and a means secured to the upper section of the plunger and having a slidable engagement with said partition.

5. In a device of the character described, a suitable supporting frame and a receptacle carried thereby, a hopper arranged in said receptacle, a guide way carried by the bottom of said receptacle, a reciprocating plunger operating in said guide way and arranged to pass through said hopper, said plunger being composed of two sections hingedly secured together, the free end of said upper section being concaved, a resilient member arranged at the top of said guide way and surrounding said plunger, a driving mechanism, a means connecting said driving mechanism with said plunger, a transverse partition in said receptacle arranged along side of said guide way and hopper and having its upper edge outwardly curved relative to the hopper, and a means secured to the upper section of the plunger and having a slidable engagement with said partition.

In testimony whereof I have signed my name to this specification in the presence of two subscribing witnesses.

OSCAR BRUNKA.

Witnesses:
  J. A. FITE,
  MAY MONTGOMERY.